United States Patent [19]
Field

[11] Patent Number: 5,472,609
[45] Date of Patent: Dec. 5, 1995

[54] WATER CONDITIONER BACKFLUSH DEVICE

[75] Inventor: George R. Field, Edmonton, Canada

[73] Assignee: Big Iron Drilling Ltd., Edmonton, Canada

[21] Appl. No.: 368,651

[22] Filed: Jan. 4, 1995

[51] Int. Cl.$^6$ .................................................. B01J 49/00
[52] U.S. Cl. .............................................. 210/541; 210/279
[58] Field of Search ............................. 210/275, 288, 210/289, 291, 279, 541

[56] References Cited

U.S. PATENT DOCUMENTS

| | | | |
|---|---|---|---|
| 3,395,099 | 7/1968 | Johnson | 210/275 |
| 3,455,458 | 7/1969 | Johnson | 210/275 |

FOREIGN PATENT DOCUMENTS 1273721  9/1990  Canada.

*Primary Examiner*—Ivars Cintins
*Attorney, Agent, or Firm*—George A. Seaby

[57] ABSTRACT

A device for backwashing a particulate mineral bed in a water conditioner includes a tubular casing; a tube co-axial with and extending through the casing beyond the ends thereof; a cap slidable on the tube for movement between a closed position on the open top end of the casing and an open position spaced apart from the top end of the casing; a spring biasing the cap to the closed position; an opening in the tube for discharging water into the cap to cause the latter to move away from the casing to the open position; a first valve including a valve body closing the bottom end of the casing; a first passage in the valve body in fluid communication with the bottom end of the tube, the first passage being normally open to the flow of water upwardly from the bed of particulate material into the tube; a ball in the body for closing the first passage when the flow of water is reversed in the tube; a second passage in the top of the body communicating with the first passage; a second valve normally closing the second passage for discharging water from the valve body when the flow of water is reversed in the tube; and a hood on the tube above the valve body defining a venturi opening in the bottom end of the casing permitting the flow of particulate material into the casing. In order to prevent compaction or cementing of the bottom of the bed, a hole extends through the ball in the first valve.

7 Claims, 5 Drawing Sheets

WATER CONDITIONER BACKFLUSH DEVICE

BACKGROUND OF THE INVENTION

1. Field of the Invention

This invention relates to a device for backwashing the bed of particulate material in an iron filter or a water conditioner.

2. Discussion of the Prior Art

As described in detail in Canadian Patent No. 1,273,721, which issued to the present inventor on Sep. 4, 1990, backwashing devices for use in iron filters and water conditioners tend to be somewhat inefficient. Examples of backwashing devices are found in U.S. Pat. Nos. 3,395,099, issued to R. D. Johnson on Jul. 30, 1968 and 3,455,458, issued to R. D. Johnson on Jul. 15, 1969. The Johnson devices employ separate, spaced apart tubes. In one embodiment of the Johnson inventions, particulate mineral is drawn into one of the tubes in a limited area beneath the tube. The other Johnson device involves separate, parallel tubes or a spiral tube on a second tube. In each case, suction for backwashing is created by means of a fine nozzle. It has been found that such devices become clogged to the point of inoperability. Moreover, such prior art devices cannot be used with commercial water treatment control valves with up flow brine controls, because the regenerative chemical will by-pass the bed.

The device as described in the above-identified Canadian patent goes a long way to providing an efficient backwash device. However, a problem encountered with the earlier invention is that of bed cementing, i.e. the bed of particulate material, particularly in the bottom of the tank, becomes compacted during use. The compaction or cementing is such that the portion of useful bed is substantially reduced, and the efficiency of the device suffers badly. Moreover, because of bed compaction during use of the water conditioner, when backwashing there is no movement of water through the bed at the lower end of the device, and consequently the water conditioner ultimately becomes completely inoperable. It is necessary to disconnect the water conditioner to restore water flow for normal household use. Cementing also promotes channelling in the particulate material, resulting in reduced efficiency prior to complete clogging. The use of somewhat complicated valves at the bottom end of applicant's earlier invention also led to problems such as the reverse flow of contaminants following a backwashing operation.

GENERAL DESCRIPTION OF THE INVENTION

An object of the present invention is to improve upon existing devices (including the inventor's earlier device) by providing an even simpler backflush device which is relatively efficient and free of bed cementing or compaction.

Another object of the invention is to provide a device of the above defined type which is structurally simple and durable.

Yet another object of the invention is to avoid the use of complicated valves at the bottom end of the device which are sensitive to particulate matter and variations in water pressure and rate of flow.

Accordingly, the present invention relates to a device for backwashing a bed of particulate material in a water softener comprising tubular casing means; tube means co-axial with said casing means and extending through said casing means beyond the ends thereof; cap means slidable on said tube means for movement between a closed position in which said cap means closes an open top end of said casing means and an open position in which said cap means is spaced apart from said open top end of the casing means; spring means biasing said cap means to the closed position; opening means in said tube means for discharging water into said cap means to cause the latter to move away from said casing means to the open position; first valve means including valve body means closing the bottom end of said casing means; first passage means in said body means in fluid communication with the bottom end of said tube means, said first passage means being normally open to the flow of water upwardly from the bed of particulate material into said tube means; ball means in said body means for closing said first passage means when the flow of water is reversed in said tube means; second passage means in the top of said body means communicating with said first passage means; second valve means normally closing said second passage means for discharging water from said valve body means when the flow of water is reversed in said tube means; hole means extending through said ball means; and hood means on said tube means above said valve body means defining a venturi opening in the bottom end of said casing means permitting the flow of particulate material into said casing means, whereby, when during a backflush operation water is caused to flow downwardly in said tube means under pressure the first valve means is closed with respect to the bed of particulate material, water passes through said first opening means under pressure to move said cap means to the open position, water passes through said second passage means in said body means to open said second valve means, and water flows from the valve body means upwardly into the bottom of said casing means to create a venturi flow beneath said hood means and in said casing means which draws particulate material into the bottom end of said casing means and discharges the water and particulate material through the open top end of the casing means, and, when the hole means is aligned with said first passage means, water passes downwardly from said body means into the bed of particulate material to agitate the bed and to prevent cementing of the particulate material.

BRIEF DESCRIPTION OF THE DRAWINGS

The invention is described below in greater detail with reference to the accompanying drawings, which illustrate preferred embodiments of the invention, and wherein.

DESCRIPTION OF THE PREFERRED EMBODIMENT

Figure 1:
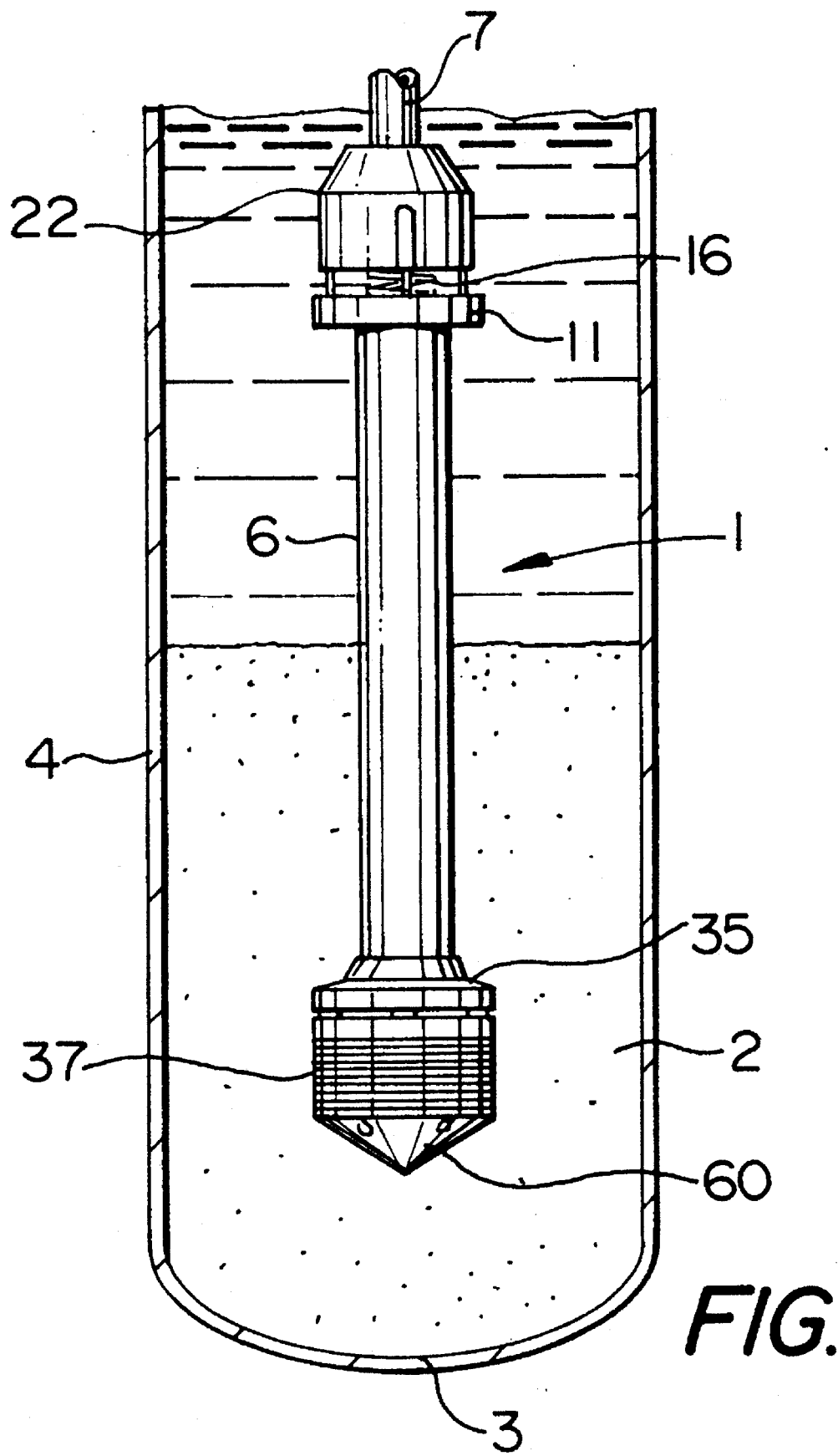
FIG. 1 is a schematic longitudinally sectional view of the bottom end of a water treatment apparatus containing a device in accordance with the present invention.
Figure 2:
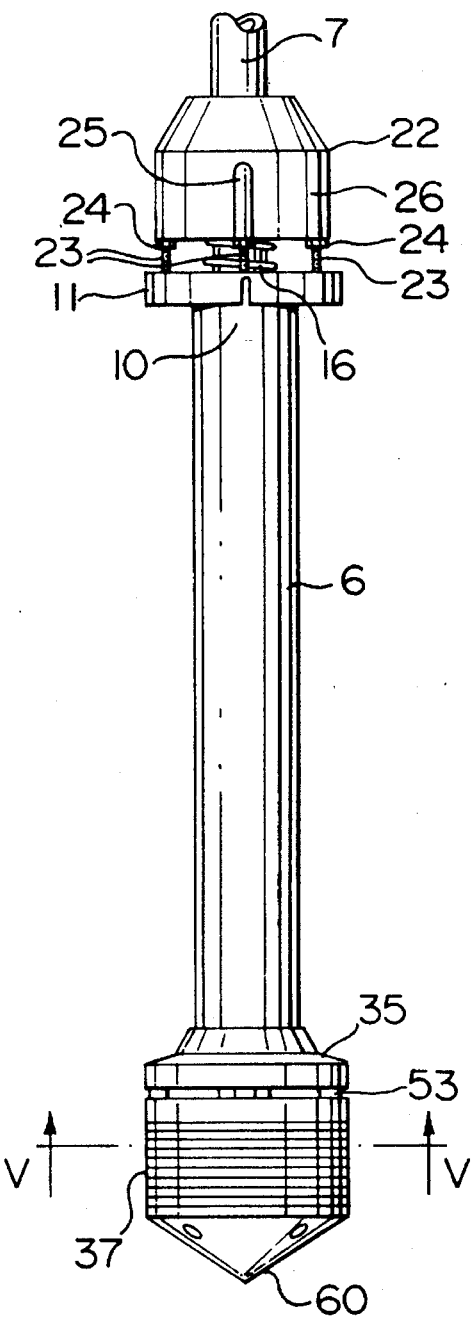
FIG. 2 is a side view of the device of FIG. 1.
Figure 3:
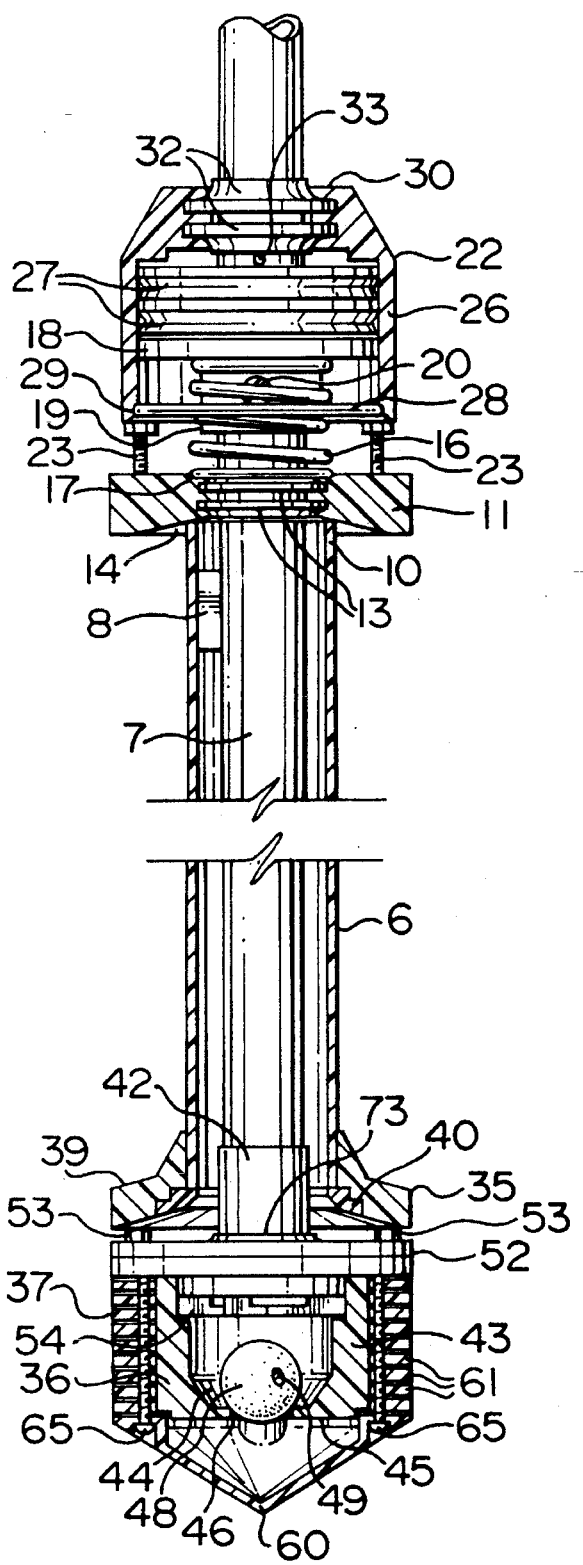
FIG. 3 is a longitudinal sectional view of the device of FIG. 2.

With reference to FIGS. 1 to 3, the backwash device of the present invention which is generally indicated at 1 is intended for use in a bed 2 of a particulate material mounted in the bottom end 3 of a water conditioner tank 4. The device 1 includes an elongated, tubular casing 6. An elongated tube 7 extends through the casing 6 for carrying water into and out of the device. The tube 7 is centered in the casing 6 by three fins 8 (one shown—FIG. 3) extending radially outwardly from the tube into contact with the casing 6. The fins 8 are spaced equidistant apart around the periphery of the tube 7.

Figure 4:
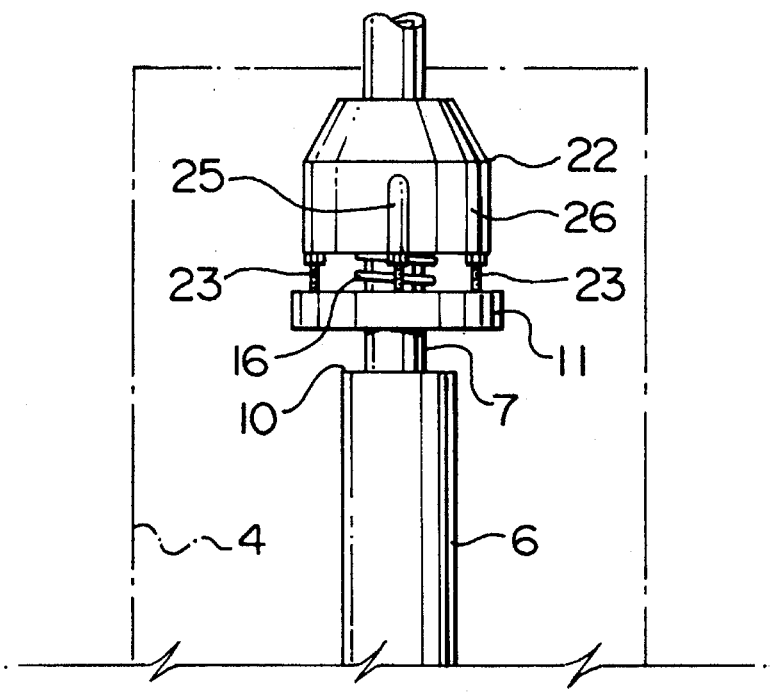
FIG. 4 is a side view of the top end of the device of FIGS. 1 to 3 in the open, backflush position.

The open top end 10 of the casing 6 is normally closed by a ring-shaped cap 11, which is slidably mounted on the tube 7. The cap 11 is sealed with respect to the tube 7 by means of annular lip seals 13. The bottom surface 14 of the cap 11 slopes upwardly and inwardly from its periphery for deflecting material expelled from the casing outwardly and downwardly. The cap 11 is biased to the down or closed position by a helical spring 16, the flattened bottom end of which is seated in a concave, annular groove 17 in the top of the cap 11. The spring 16 extends between the cap 11 and the main body 18 of a sleeve 19. The sleeve 19 is fixedly mounted on the tube 7 by means of a screw 20. The main body 18 of the sleeve 19 slidably supports a cap-shaped piston 22 for movement with the cap 11 between a closed position (FIGS. 2 and 3) and an open position (FIG. 4).

The piston 22 is connected to the cap 11 by bolts 23 extending through the ring and upwardly through nuts 24 into longitudinally extending projections 25 on the cylindrical side wall 26 of the piston 22. The piston 22 is sealed with respect to the body 18 of the sleeve 19 by annular lip seals 27 mounted in recesses in the sleeve. Upward movement of the piston 22 is limited by a split ring 28 mounted in an annular groove 29 in the bottom end of the piston. As the piston 22 moves upwardly the ring 28 engages the bottom end of the main body 18 of the sleeve 19 which stops the piston and consequently the cap 11. The top end 30 of the piston 22 is sealed with respect to the tube 7 by a pair of annular seals 32. A hole 33 is provided in the tube 7 between the top end of the sleeve body 18 and the top end 30 of the piston 22. Water under pressure exiting the hole 33 causes the piston 22 and consequently the cap 11 to move upwardly.

The tube 7 extends downwardly beyond the bottom end of the casing 6. A hood 35 is mounted on the bottom end of the casing 6 above the bottom end of the tube 7. A valve body 36 and a screen generally indicated at 37 are mounted on the bottom end of the tube 7. The annular hood 35 includes a plastic body 39 with a harder plastic insert 40 in the bottom inner end thereof for protecting the bottom end of the casing 6. A stainless steel sleeve 42 is mounted on the bottom end of the tube 7 for protecting the latter. The sleeve 42 prevents holes forming in the side of the tube 7 when particulate material flowing rapidly into the gap between the hood 35 and the top of the valve body 36 strikes the tube 7.

Figure 5:
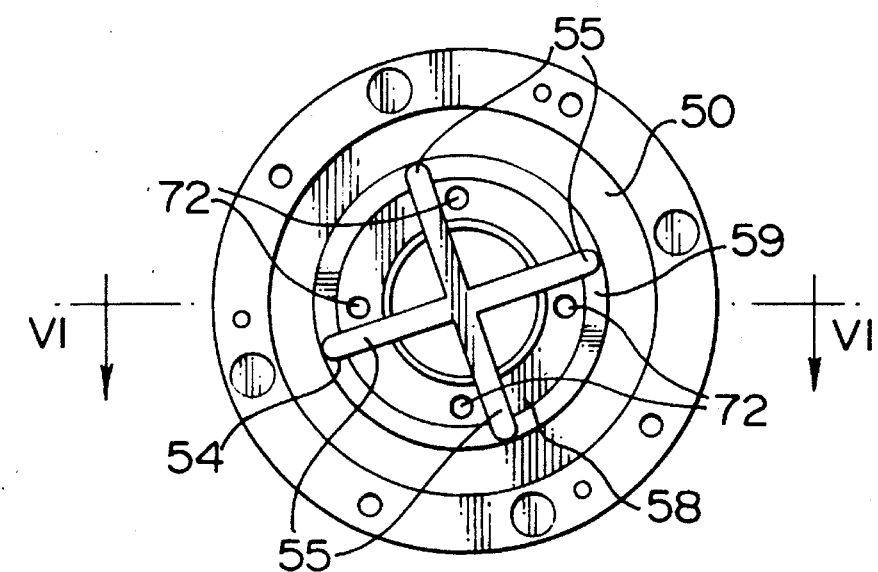
FIG. 5 is a cross section taken generally along line V—V of FIG. 2.
Figure 6:
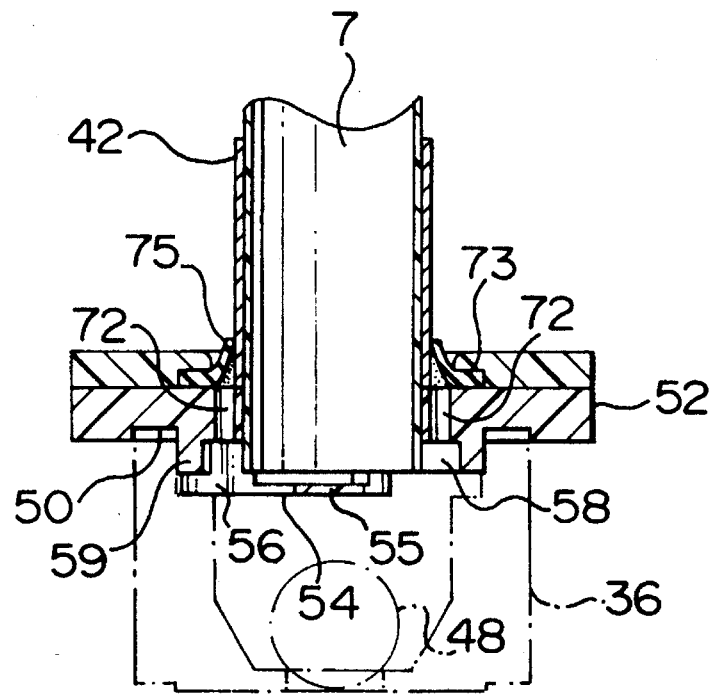
FIG. 6 is a cross section taken generally along line VI—VI of FIG. 5.

The valve body 36 is generally cup-shaped, with a cylindrical side wall 43, the interior surface 44 of which tapers downwardly to a bottom wall 45 containing a central opening 46. The opening 46 is normally closed by a ball 48 with a hole 49 extending diametrically therethrough. The top end of the body 36 extends into an annular groove 50 (FIGS. 5 and 6) in a top wall 52, which is attached to and surrounds the open bottom end of the tube 7. The top wall 52 is connected to and spaced from the hood 35 by sleeves 53 and screws (not shown) extending downwardly through the hood into the top wall 52. The ball 48 is prevented from blocking the bottom end of the tube 7 by a cruciform spacer 54. As best shown in FIGS. 5 and 6, the spacer includes L-shaped arms 55, the outer ends 56 of which extend upwardly into an annular groove 58 between the bottom end of the tube 7 and the inner side wall 59 of the groove 50.

Figure 7:
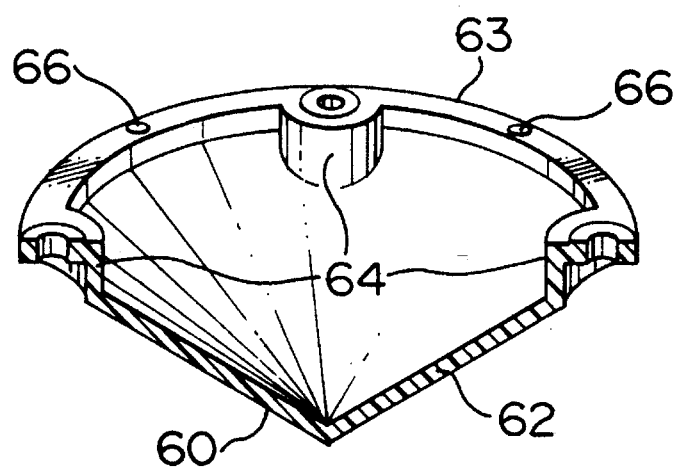
FIG. 7 is an isometric view of a section of the bottom end of a strainer used in the device of FIGS. 1 to 3.
Figure 8:
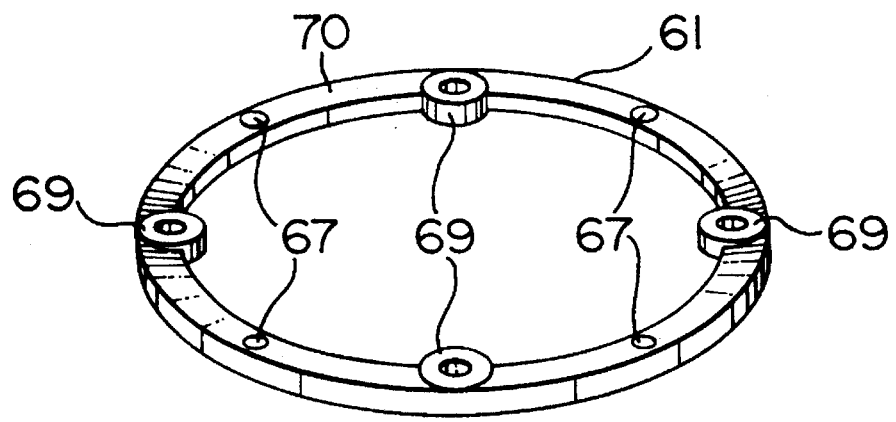
FIG. 8 is an isometric view of a ring used in the strainer.

During normal use of the device, water passing through the bed 2 of particulate material enters the tube via the screen 37. The screen 37 includes a conical base 60 and a plurality of rings 61. As best shown in FIG. 7, the base 60 includes a conical body 62 and a top reinforcing rim 63 integral with the body. Four cylindrical posts 64 in the rim 63 receive long screws 65 (FIG. 3) for mounting the screen on the bottom of the top wall 52 of the valve body. Small circular projections 66 are provided between the posts 64. Similar projections 67 are provided on the top surface of each of the rings 61. The projections 66 and 67 act as spacers so that there is a narrow gap between the base 60 and the adjacent ring 61, and between adjacent rings 61 for admitting water but no particulate material into the valve body. Each ring 61 has small reinforcing rings 69 for receiving the screws 65. The top surface 70 of the ring 61 slopes slightly downwardly and inwardly, so that the passages between the rings 61 widen slightly inwardly.

In order to backflush the particulate material in the bed 2, the flow of water in the apparatus is reversed, i.e. water is pumped down the tube 7 under pressure. The water enters the valve body 36 and pushes the ball 48 against the opening 46. When the back pressure in the tube 7 builds up sufficiently, water entering the area between the top 30 of the piston 22 and the top of the sleeve 19 forces the piston 22 and consequently the cap 11 upwardly against the bias of the spring 16. When the piston 22 reaches the top of its stroke, the split ring 28 engages the bottom edge of the sleeve body 18. Pressure again builds up, and water then escapes from the valve body 36 via spaced apart holes 72 (FIG. 6) in the top wall 52. The holes 72 are normally closed by a second valve defined by a flexible skirt 73 mounted in the top wall 52 of the valve body. The skirt 73 includes a vertical sleeve 75 which normally presses against the tube 7. Water pushes the sleeve 75 outwardly and the water jets upwardly through the casing 6 along the tube 7 (the sleeve 75 ensures a more efficient venturi effect than the valves in the applicant's original invention). The upward flow of water draws particulate material into the bottom end of the casing 6 for upward flow between the casing 6 and the tube 7 by venturi action for discharge through the gap between the top end 10 of the casing and the cap 11. The steel sleeve 42 ensures that the bottom end of the tube 7 is not damaged by the particulate material.

There is turbulence in the casing 6 which dislodges foreign matter from the particulate material. Additional removal of contaminants occurs when (i) the particulate material hits the inside of the casing 6 and the outside of the tube 7 (ii) particulate material strikes the bottom surface 14 of the cap 11, and (iii) particulate material is dislodged laterally against the side wall of the tank 4. Most importantly, particulate material hits itself, i.e. particles propelled at high speed strike each other to clean the particulate material. The foreign matter is generally lighter than the mineral making up the particulate material. Consequently, the foreign matter remains in the water while the particulate mineral settles on top of the bed 2. The foreign matter is washed from the tank 4 with backwash water through a conventional port (not shown) to drain.

The operation described above occurs when the ball 48 fully blocks the opening 46 in the bottom wall 45 of the valve body 36, or when the hole 49 in the ball 48 is partially aligned with the opening 46. When the hole 49 is more or less fully aligned with the opening 46, water under pressure enters the particulate material via the screen 37 to stir up the material. Thus, the likelihood of cementing at the bottom of the bed is eliminated. If the hole 49 is fully aligned with the opening 46, the water entering the valve body 36 from the tube 7 is discharged into the bed to stir up the latter. There may be insufficient pressure to open the second valve in the top wall 52, and accordingly backflushing via the venturi may not occur. In any event, the bottom of the bed is stirred up in preparation for the next backflushing operation. Such complete or full alignment is believed to be infrequent and accordingly backflushing usually occurs when the flow of water in the tube 7 is reversed.

Upon completion of the backwashing operation, the flow of water downwardly in the tube 7 is stopped, whereupon the upward flow of water through the casing 6 ceases, because the valve defined by the skirt 73 closes. The spring 16 returns the piston 22 and the cap 11 to the rest position on the top end of the casing 6.

Figure 9:
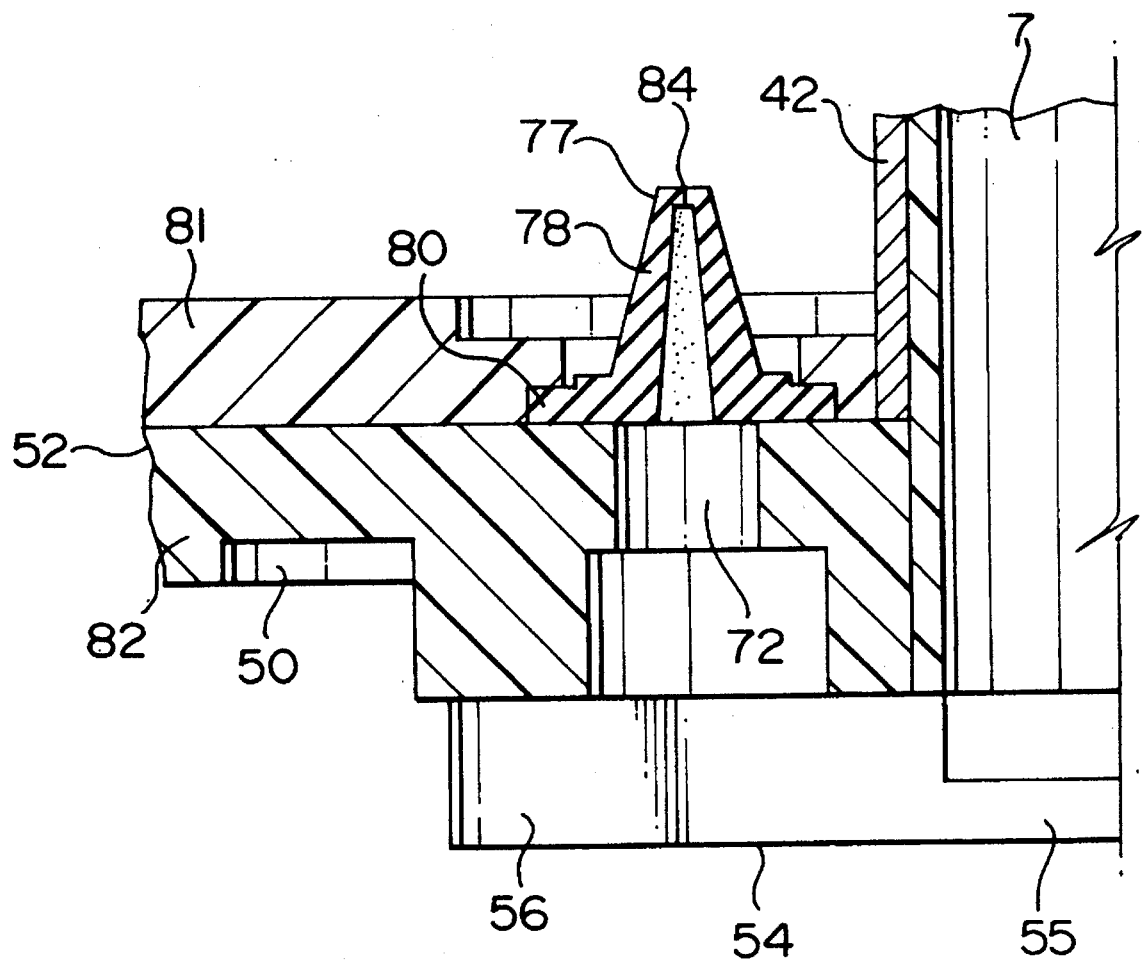
FIG. 9 is a cross section of one side of the top end of an alternate form of valve body used in the device of FIGS. 1

Referring to FIG. 9, an alternate form of the second valve includes small nipples 77 which are mounted in the top wall 52 at the upper, discharge ends of the holes 72. Each nipple 77 includes a frusto-conical body 78 with an annular flange 80 at the bottom end thereof. The flange 80 is sandwiched between top and bottom layers 81 and 82, respectively of the top wall 52. A slit 84 is provided in the top end of the body 78. When there is a sufficient pressure build-up in the valve body 36, water opens the slit 84. When the pressure decreases, the slit 84 closes. The slits 84 like the skirt 75 provide for an efficient venturi effect. Moreover, the slits 84 define an efficient check valve for preventing the reverse flow of fine mineral particles in the service mode, i.e. after backwashing has been completed. Poor venturi and minerals in the water supply were serious problems in the original invention of applicant.

I claim:

1. A device for backwashing a bed of particulate material in a water softener comprising tubular casing means; tube means co-axial with said casing means and extending through said casing means beyond the ends thereof; cap means slidable on said tube means for movement between a closed position in which said cap means closes an open top end of said casing means and an open position in which said cap means is spaced apart from said open top end of the casing means; spring means biasing said cap means to the closed position; opening means in said tube means for discharging water into said cap means to cause the latter to move away from said casing means to the open position; first valve means including valve body means closing the bottom end of said casing means; first passage means in said body means in fluid communication with the bottom end of said tube means, said first passage means being normally open to the flow of water upwardly from the bed of particulate material into said tube means; ball means in said body means for closing said first passage means when the flow of water is reversed in said tube means; second passage means in the top of said body means communicating with said first passage means; second valve means normally closing said second passage means for discharging water from said valve body means when the flow of water is reversed in said tube means; hole means extending through said ball means; and hood means on said tube means above said valve body means defining a venturi opening in the bottom end of said casing means permitting the flow of particulate material into said casing means, whereby, when during a backflush operation water is caused to flow downwardly in said tube means under pressure the first valve means is closed with respect to the bed of particulate material, water passes through said first opening means under pressure to move said cap means to the open position, water passes through said second passage means in said body means to open said second valve means, and water flows from the valve body means upwardly into the bottom of said casing means to create a venturi flow beneath said hood means and in said casing means which draws particulate material into the bottom end of said casing means and discharges the water and particulate material through the open top end of the casing means, and, when the hole means is aligned with said first passage means, water passes downwardly from said body means into the bed of particulate material to agitate the bed and to prevent cementing of the particulate material.

2. A device according to claim 1, including metal sleeve means on a bottom end of said tube means above said valve body means for preventing damage to said tube means during the flow of particulate material into the bottom end of said casing means.

3. A device according to claim 2, wherein said hood means includes an annular plastic body, and a hard plastic insert in the bottom of said body protecting the bottom end of said casing means during a backflushing operation.

4. A device according to claim 1, including annular cover means defining the top wall of said valve body means and surrounding the bottom end of said tube means; and a plurality of spaced apart second openings means in said cover means defining said second passage means.

5. A device according to claim 4, wherein said second valve means includes flexible skirt means surrounding the bottom end of said tube means normally closing said second opening means for opening under pressure when water passes through said second passage means.

6. A device according to claim 4, wherein said second valve means includes resilient nipple means normally closing each said second opening means; and slit means in said nipple means for opening under pressure when water passes through said second passage means.

7. A device according to claim 1, including spacer means in said valve body means for maintaining said ball means spaced apart from the bottom end of said tube means to prevent closing of said tube means by said ball means.

* * * * *